R. U. GAVETTE.
FRUIT PICKER'S SACK.
APPLICATION FILED APR. 27, 1916.
1,216,561.
Patented Feb. 20, 1917.
2 SHEETS—SHEET 2.
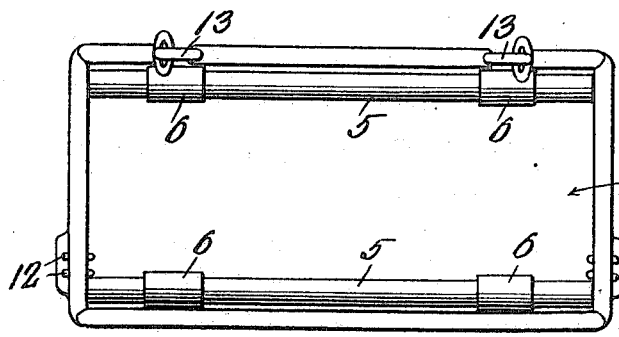
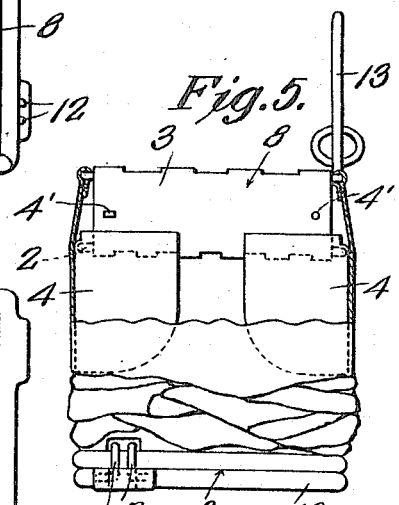
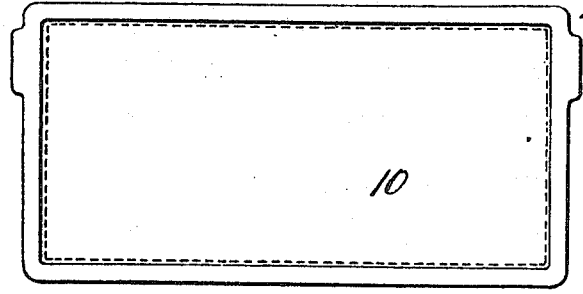
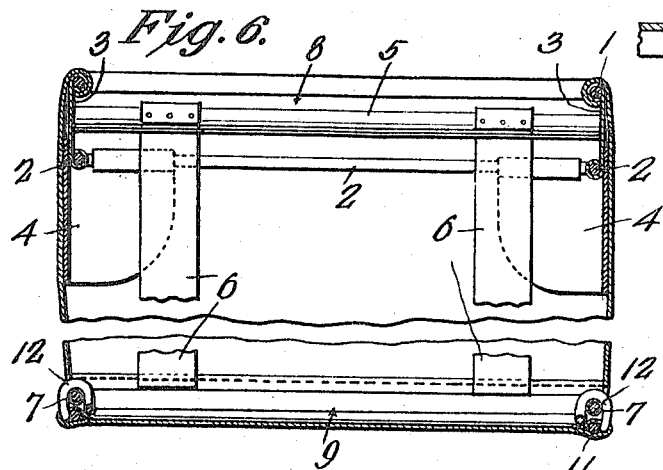
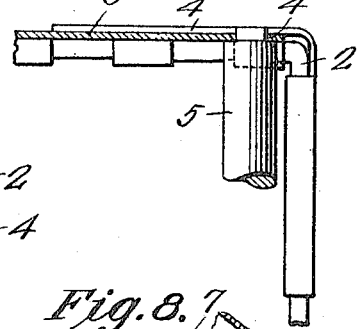
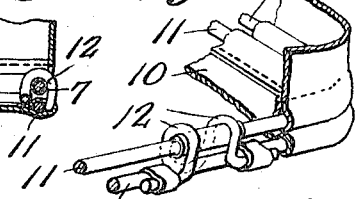
Witnesses
James F. Crown
Inventor
R. U. Gavette,
By Chandler & Chandler
Attorneys

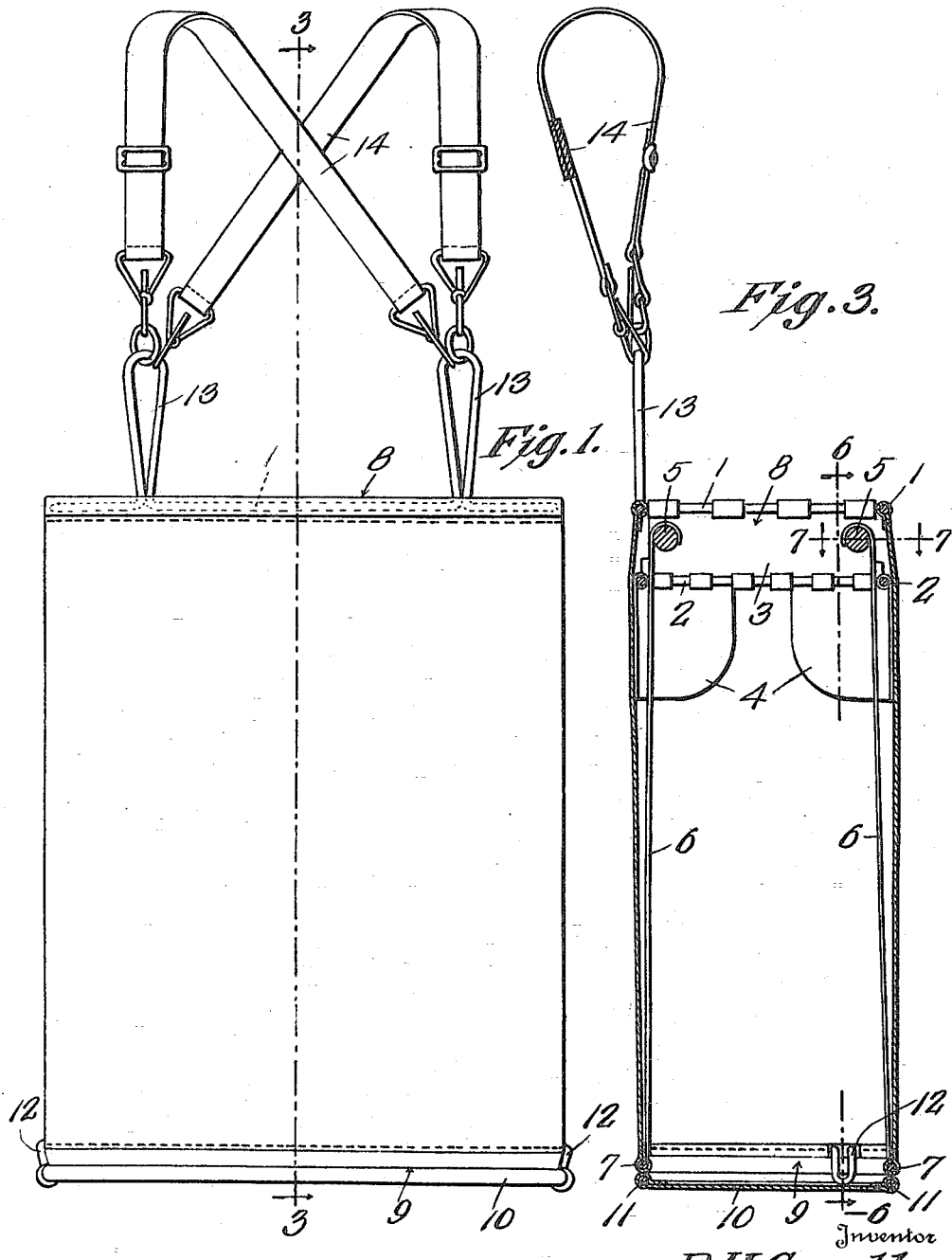

UNITED STATES PATENT OFFICE.

RALPH U. GAVETTE, OF GRAND JUNCTION, COLORADO.

FRUIT-PICKER'S SACK.

1,216,561.  Specification of Letters Patent.  Patented Feb. 20, 1917.

Application filed April 27, 1916. Serial No. 94,041.

*To all whom it may concern:*

Be it known that I, RALPH U. GAVETTE, a citizen of the United States, residing at Grand Junction, in the county of Mesa, State of Colorado, have invented certain new and useful Improvements in Fruit-Pickers' Sacks; and I do hereby declare the following to be a full, clear, and exact description of the invention, such as will enable others skilled in the art to which it appertains to make and use the same.

The present invention is directed to improvements in fruit pickers' sacks, and has for its object to provide a device of this character adapted to be supported by a person for receiving picked fruit.

A further object of the invention is to provide a device of this character constructed in such a manner that the same will increase in depth as the fruit is deposited therein, thus preventing the fruit from becoming bruised which usually occurs when dropping fruit into deep receptacles.

A still further object of the invention is to provide a sack of this character provided with a hingedly connected bottom so that the fruit can be conveniently removed, said bottom being yieldably supported so that the same will move downwardly as the weight of the fruit increases.

With the above and other objects in view the invention consists in the details of construction and in the arrangement and combination of parts to be hereinafter more fully described and particularly pointed out in the appended claims.

In describing the invention in detail reference will be had to the accompanying drawings wherein like characters of reference denote corresponding parts in the several views, and in which—

Figure 1 is a front view of the device;

Fig. 2 is a top plan view;

Fig. 3 is a sectional view on line 3—3 of Fig. 1;

Fig. 4 is a bottom plan view;

Fig. 5 is an end view showing the sack in a position previous to receiving fruit;

Fig. 6 is a sectional view on line 6—6 of Fig. 3;

Fig. 7 is a sectional view on line 7—7 of Fig. 3; and

Fig. 8 is a fragmentary detail perspective view of a lower end of the sack.

Referring to the drawing 1 and 2 designate a pair of vertically spaced frames, which are formed from metal, and are rectangular in shape, said frames being held in spaced relation by the plates 3. Secured to the ends of the side bars of the frame 2 are angle stop plates 4, the purpose of which will appear later.

The plates 3 are provided with bearings 4' for supporting the spring rollers 5, said rollers being of conventional form and have wound thereon straps 6, the lower ends of which are fixed to the bottom frame 7, said frame being also rectangle in shape.

A covering of suitable fabric has its upper edge attached to the frame 1, and its lower edge attached to the frame 7, said covering having an open top and bottom 8 and 9, respectively, the latter being normally closed by the bottom 10, which is formed from fabric and secured to the frame 11. The frame 11 is rectangular in shape and has one of its side bars hingedly connected to one of the side bars of the bottom frame 7. Clips 12 are carried by the end bars of the frame 11 and are adapted to detachably engage the end bars of the frame 7 to hold the bottom closed.

The innermost side bar of the frame 1 is provided with loops 13 to which the shoulder straps 14 are connected, said straps serving to suspend the device on a person so that the fruit can be conveniently placed therein after being picked.

From the foregoing description it will be seen that as the fruit is deposited on the bottom 10 the weight thereof will gradually cause the bottom to move downwardly, thus unwinding the straps 6 from the rollers 5 and placing the rollers under tension. As soon as the device is filled the bottom is opened and the fruit removed, whereby the rollers will rewind the straps thereon, thus pulling the frame 7 upwardly until the same engages the stop plates 4.

What is claimed is:—

1. A fruit picker's sack comprising upper frames and a lower frame, a fabric covering connecting the uppermost frame and the lower frame, spring rollers associated with the upper frames, straps windable on the rollers and having their lower ends connected to the lower frame, and a bottom hingedly connected to the lower frame.

2. A fruit picker's sack comprising a pair of upper frames and a bottom frame, plates connecting the upper frames, spring rollers having their ends journaled in the plates, straps having their upper ends windable on the rollers and having their lower ends connected to the bottom frame, stop plates carried by the lowermost upper frame to limit the upward movement of the bottom frame, a covering of fabric connecting the uppermost frame and bottom frame, and a bottom hingedly connected to the bottom frame.

3. A fruit picker's sack comprising a pair of upper frames, plates connecting the frames, spring rollers supported by the plates, depending stop plates supported by the lowermost frame, a bottom frame, straps windable on the rollers and having their lower ends fixed to the bottom frame, a fabric covering connecting the uppermost frame and the bottom frame, said stop plates serving to limit the upward movement of the bottom frame and preventing the fabric covering from coming in contact with the rollers.

4. A fruit picker's sack comprising a frame, spring actuated rollers associated with the frame, a bottom frame, a fabric covering connecting the first and second named frames, straps having their upper ends secured to the rollers and windable thereon, the lower ends of said straps being connected to the bottom frame, and a bottom hingedly connected to the bottom frame.

In testimony whereof, I affix my signature, in the presence of two witnesses.

RALPH U. GAVETTE.

Witnesses:
R. W. TODD,
BEN GRIFFITH.

Copies of this patent may be obtained for five cents each, by addressing the "Commissioner of Patents, Washington, D. C."